US007941271B2

(12) United States Patent
Ofek (10) Patent No.: US 7,941,271 B2
(45) Date of Patent: May 10, 2011

(54) DISPLAYING IMAGES RELATED TO A REQUESTED PATH

(75) Inventor: Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 11/562,143

(22) Filed: Nov. 21, 2006

(65) Prior Publication Data
US 2008/0120023 A1 May 22, 2008

(51) Int. Cl.
*G01C 21/00* (2006.01)
*G08G 1/123* (2006.01)

(52) U.S. Cl. ........ 701/211; 701/207; 701/209; 348/116; 340/995.1; 340/995.12; 340/995.24

(58) Field of Classification Search .................. 701/200, 701/207; 340/995.1
See application file for complete search history.

(56) References Cited

U.S. PATENT DOCUMENTS

| 6,199,014 | B1 * | 3/2001 | Walker et al. ................. 701/211 |
| 6,442,479 | B1 | 8/2002 | Barton |
| 6,621,423 | B1 * | 9/2003 | Cooper et al. ........... 340/995.24 |
| 7,451,041 | B2 * | 11/2008 | Laumeyer et al. ............ 701/209 |
| 7,630,830 | B2 * | 12/2009 | Watanabe .................... 701/200 |
| 2002/0183072 | A1 * | 12/2002 | Steinbach et al. ............ 455/456 |
| 2003/0009281 | A1 | 1/2003 | Whitham |
| 2003/0208315 | A1 * | 11/2003 | Mays ............................. 701/211 |
| 2004/0107072 | A1 * | 6/2004 | Dietrich et al. ............... 702/153 |
| 2004/0249565 | A1 * | 12/2004 | Park .............................. 701/200 |
| 2005/0004749 | A1 * | 1/2005 | Park .............................. 701/200 |

FOREIGN PATENT DOCUMENTS

| KR | 1020000054322 | 9/2000 |
| KR | 1020000054438 | 9/2000 |
| KR | 1020040031139 | 4/2004 |

OTHER PUBLICATIONS

International Search Report with Written Opinion dated May 30, 2008.
European Search Report dated Oct. 30, 2009.

* cited by examiner

*Primary Examiner* — Thomas G Black
*Assistant Examiner* — Lin B Olsen
(74) *Attorney, Agent, or Firm* — Shook, Hardy & Bacon L.L.P.

(57) ABSTRACT

A system, method and computer-readable media are disclosed for displaying images corresponding to a path. The method can include downloading a path and one or more images corresponding to positions along the path, wherein the downloaded images are actual images of an environment near the corresponding positions. Additionally, the method can include detecting a position of a mobile device, and providing the downloaded images as the mobile device moves to the corresponding detected positions along the path.

20 Claims, 5 Drawing Sheets

DISPLAYING IMAGES RELATED TO A REQUESTED PATH

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Driving directions are one of the most popular mapping applications online. Such mapping applications allow users to receive a map of a path and corresponding directions based on the user inputting starting and ending locations. However, one of the challenges of such mapping applications is that use of the provided map and directions is mainly done offline, such that one of the most common outputs of a driving direction application is a printout of the route map. With a growing trend of providing multimedia content to mobile devices in remote locations, it may become less desirable to require users to have to print the directions in order to use and follow the directions.

Another drawback with the output of current mapping applications is the quality of the image map related to the directions. The related image map is generally not the same as the actual scene that a user will see when traveling. The difference between what is displayed on the route map and the actual scene, as seen from a driver, pedestrian, or hiker for example, may not be trivial. For example, the actual scene may contain a large amount of visual details such as store fronts, houses, vegetation, etc., that are not represented on the map. Not having the actual imagery of what the user is actually seeing may reduce the confidence of the user, such that the user may wonder if he/she has missed an important step in following the directions.

SUMMARY

A system, method, and computer-readable media are provided for displaying images corresponding to a path. Accordingly, a user is able to request a path including a set of directions, wherein the path contains one or more positioning identifiers. Images associated with each positioning identifier of the path can be downloaded along with the path to a mobile device. As the mobile device is in motion, the mobile device's location can be monitored by a position tracking device. Once the mobile device's location is detected to match one of the downloaded positioning identifiers, the image corresponding to the matched positioning identifier is displayed.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The invention in one aspect allows for the download of a video of a path from a network to a mobile device such as a laptop, personal digital assistant (PDA), smart phone, navigation system, etc. The video may contain a sequence of images, as would be seen by a user in the actual surrounding environment, as the user follows the path. The playback of this video may be governed by a position detection component included in the mobile device. The user of the mobile device can look at the display of the mobile device and compare the image with his surrounding environment to verify his position or recognize targets. These images might also include 360 degree panoramas of the expected user surrounding, either from photography, or synthesized from a 3D model, such as Virtual-Earth 3D. The part of the panorama viewed on the screen could be controlled by the user direction, given by different means such as a compass, his driving direction, or by matching to the image of his surrounding captured by a camera Referring initially to FIG. 1, an exemplary network environment for implementing the present invention is shown and designated generally as network environment 100. Network environment 100 is but one example of a suitable environment and is not intended to suggest any limitation as to the scope of use or functionality of the invention. Neither should the network environment 100 be interpreted as having any dependency or requirement relating to any one or combination of elements illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, specialty computing devices, servers, etc. The invention may also be practiced in distributed computing environments where tasks are performed by remote-processing devices that are linked through a communications network.

Figure 1:
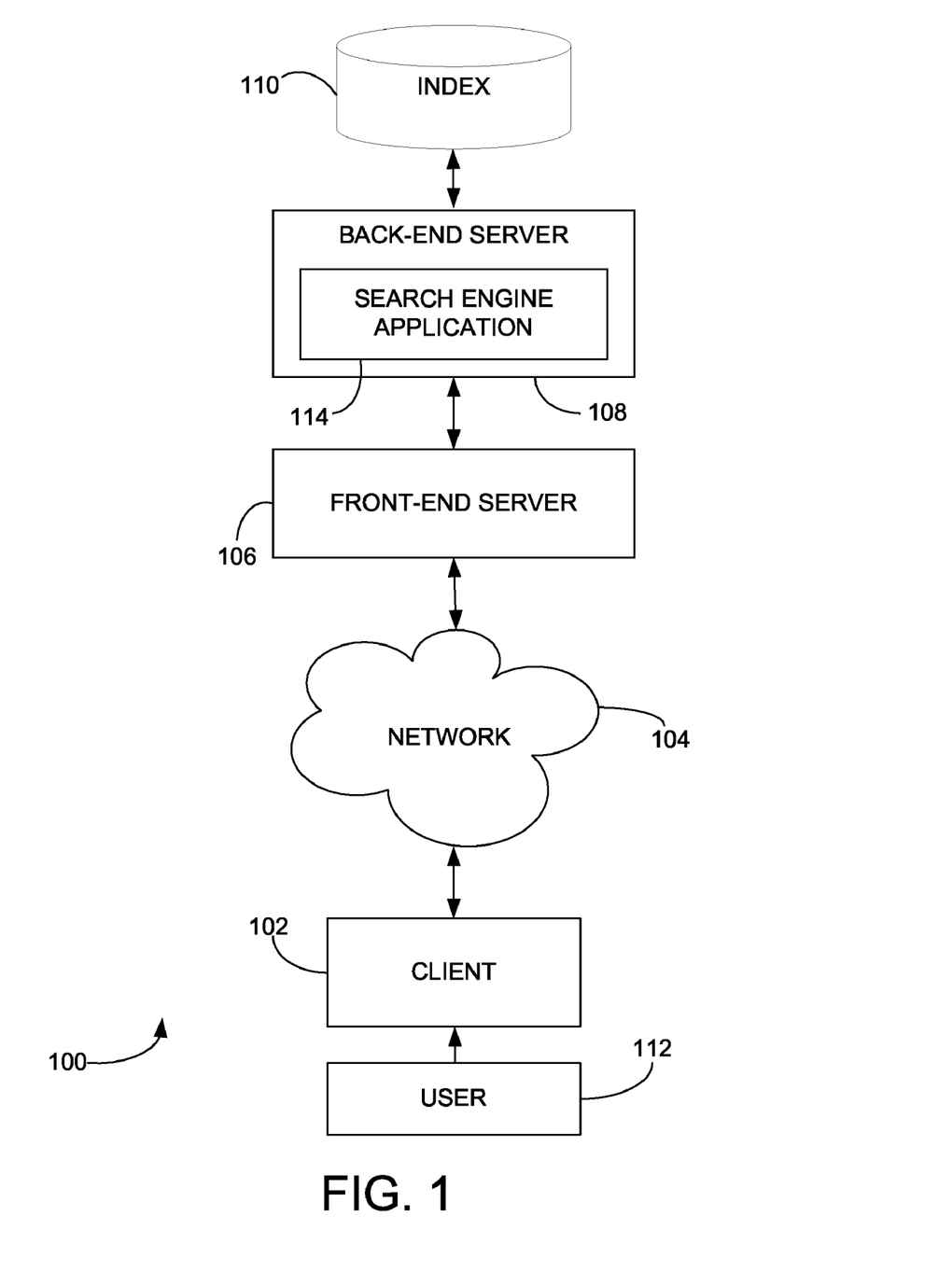
FIG. 1 is a block diagram of an exemplary operating environment for implementing the invention.

Network environment 100 includes a client 102 coupled to a network 104 via a communication interface. The communication interface may be an interface that can allow the client to be directly connected to another device or allows the client 102 to be connected to a device over network 104. Network 104 can include, for example, a local area network (LAN), a wide area network (WAN), or the Internet (or the World Wide Web). In an embodiment, the client 102 can be connected to another device via a wireless interface through a wireless network 104.

One or more servers communicate with the client 102 via the network 104 using a protocol such as Hypertext Transfer Protocol (HTTP), a protocol commonly used on the Internet to exchange information. In the illustrated embodiment, a front-end server 106 and a back-end server 108 (e.g., web server or network server) are coupled to the network 104. The client 102 employs the network 104, the front-end server 106 and the back-end server 108 to access Web page data stored, for example, in a central data index (index) 110.

Embodiments of the invention provide searching for relevant data by permitting search results to be displayed to a user 112 in response to a user-specified search request (e.g., a search query). In one embodiment, the user 112 uses the client 102 to input a search request including one or more terms concerning a particular topic of interest for which the user 112 would like to identify relevant electronic documents (e.g., Web pages). For example, the front-end server 106 may be responsive to the client 102 for authenticating the user 112 and redirecting the request from the user 112 to the back-end server 108.

The back-end server 108 may process a submitted query using the index 110. In this manner, the back-end server 108 may retrieve data for electronic documents (i.e., search results) that may be relevant to the user. The index 110 contains information regarding electronic documents such as Web pages available via the Internet. Further, the index 110 may include a variety of other data associated with the electronic documents such as location (e.g., links, or URLs), metatags, text, and document category. In the example of FIG. 1, the network is described in the context of dispersing search results and displaying the dispersed search results to the user 112 via the client 102. Notably, although the front-end server 106 and the back-end server 108 are described as different components, it is to be understood that a single server could perform the functions of both.

A search engine application 114 is executed by the back-end server 108 to identify web pages and the like (i.e., electronic documents) in response to the search request received from the client 102. More specifically, the application 114 identifies relevant documents from the index 110 that correspond to the one or more terms included in the search request and selects the most relevant web pages to be displayed to the user 112 via the client 102. In an embodiment, a routing engine application may be used instead of the search engine application 114 within back-end server 108.

Figure 2:
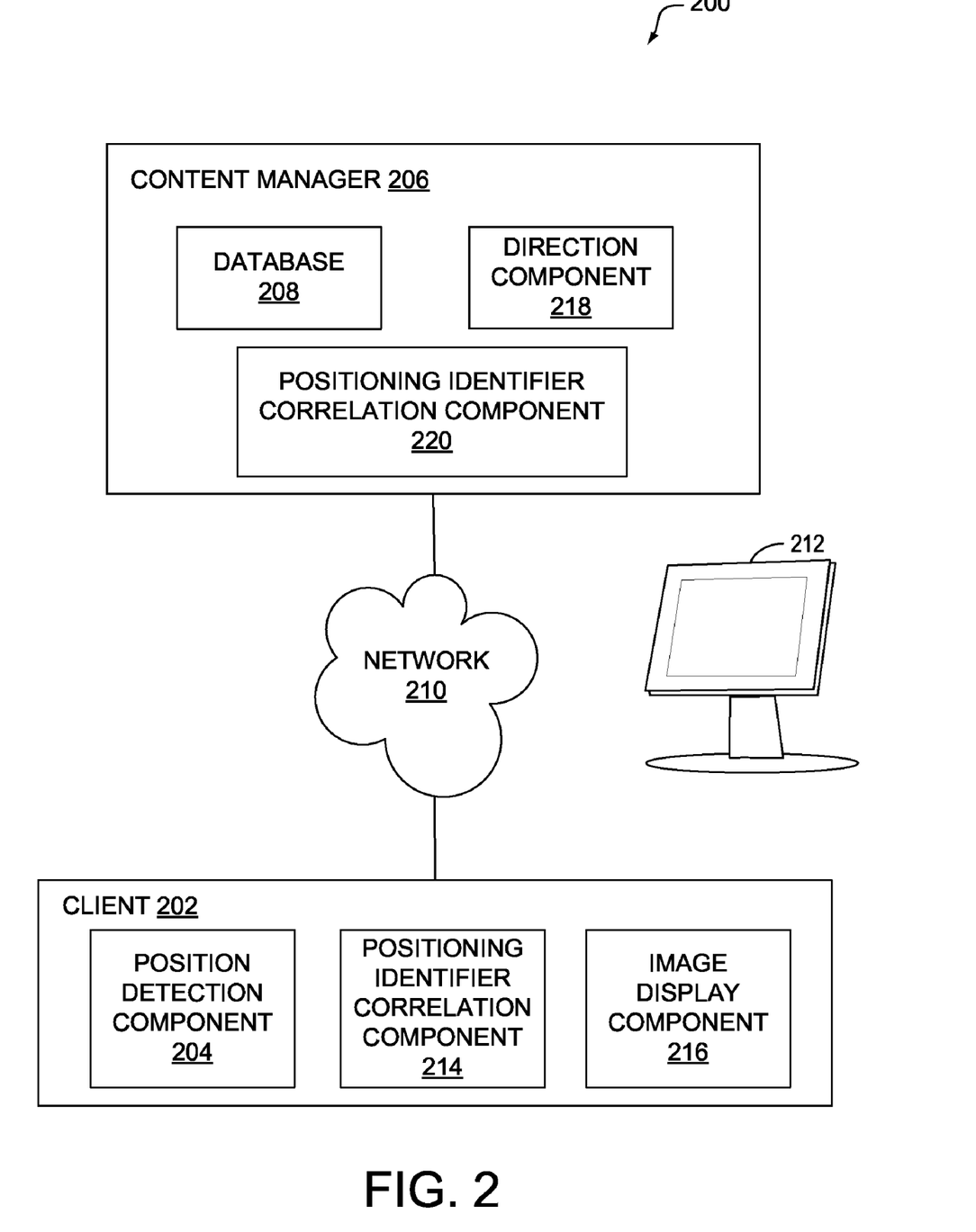
FIG. 2 is a block diagram of an exemplary system for implementing the invention.

FIG. 2 is a block diagram of an embodiment of a system 200 for implementing the invention. The system can include client 202, content manager 206, network 210, and display device 212. In an embodiment, client 202 and content manger 206 can each be a computing device 100 (FIG. 1).

Content manager 206 may be or can include a server such as a workstation running Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

In an embodiment, content manager 206 may comprise one or more elements 106, 108, 110, and 114 (FIG. 1). Content manager 206 can also include a database 208 for storing images and corresponding positioning identifiers for each image. In an embodiment, database 208 is the same as index 110 (FIG. 1). In an embodiment, the images are images of an environment taken with an image-capturing device such as a video or still-image camera. In another embodiment, the images may comprise images synthesized from a 3D model of an environment. In another embodiment, images might be full 360-degree panoramas of the outside environment around the position of the driver. In yet another embodiment, the images may be images of an environment drawn by a person or created by a computer.

In an embodiment the image-capturing device may be part of a vehicle that travels along the roads within different towns, cities, states, and countries capturing images at different distance increments. Such images may be captured from the perspective of a driver of an automobile looking through the windshield of the automobile. In other embodiments, the images are captured from other perspectives other than from the perspective of the driver of the automobile. In another embodiment, images might be full 360-degree panoramas of the outside environment around the position of the driver. In another embodiment, the images can be captured along an off-road path or other type of off-road location.

For each image captured, a positioning identifier can be associated and stored with the image. The positioning identifier can be used to identify the location, position, and/or orientation of the environment being displayed in the image. For example, the positioning identifier may be the street address of the environment being displayed in the image. In another example, the positioning identifier may be the longitudinal and latitudinal coordinates of the environment being displayed in the image.

Direction component 218 can be any conventional program used for providing navigation directions for a path to requesting users. The directions for the path can include a plurality of positioning identifiers that identify different position locations within the path. When a user of a client device requests directions for a desired path, the direction component 218 can generate the path and accompanying directions. Positioning identifier correlation component 220 is used to identify the positioning identifiers in the path and compare the positioning identifiers to those stored in database 208. When the positioning identifiers from the generated path and the database 208 match, the positioning identifier correlation component 220 can retrieve the images associated with the matched positioning identifiers and can transmit the path, directions, and images to the client device of the requesting user.

In another embodiment, additional landmark information can be associated and stored with the positioning identifiers in database 208. For example, landmarks, such as buildings, stores, monuments, sculptures, bodies of water, or other objects found in the environment, that are displayed in the captured images, can also be assigned a positioning identifier and stored with the corresponding images in database 208. Landmark information, which can be any multimedia information related to the landmark, may also be associated and stored with the landmark, positioning information, and images. For example, if the landmark is a monument, landmark information including the name of the monument and when the monument was created could be associated and stored with the landmark, positioning information, and corresponding images. In another example, the landmark information can include contextual advertisements. For example, if the landmark is a store, landmark information including any current sales that were occurring in the store could be associated with the landmark, positioning information, and corresponding images. In such an embodiment of the invention, when the user requests directions for a path, the landmark information may be transmitted and displayed to the client machine of the requesting user along with the path, directions, and images. The display of the contextual advertisements, for example, can be triggered by a position of the client machine in the vicinity of the corresponding landmark.

Client 202 may be or can include a desktop or laptop computer, a network-enabled cellular telephone (with or without media capturing/playback capabilities), wireless email client, or other client, machine or device to perform various tasks including Web browsing, search, electronic mail (email) and other tasks, applications and functions. Client 202 may additionally be a portable media device such as digital still camera devices, digital video cameras (with or without still image capture functionality), media players such as personal music players and personal video players, portable navigation devices, and any other portable media device.

Client 202 may also be or can include a server such as a workstation running Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

Client 202 can include a communication interface. The communication interface may be an interface that can allow the client to be directly connected to other devices or allows the client 202 to be connected to a device over network 210. Network 210 can include, for example, a local area network (LAN), a wide area network (WAN), or the Internet. In an embodiment, the client 202 can be connected to another client or device via a wireless interface through a wireless network 210.

Client 202 can also include position detection component 204. The position detection component 204 can be a device or system that can be used for detecting the location/position of people and objects. In an embodiment, position detection component may be a global positioning sensor. In another embodiment, the position detection component 204 can be an external component of the client 202. For example, the client may be part of a communication network wherein the network tracks the position of the client to inform the client of its current location. The position detection component 204 can categorize the current location of the client by assigning different positioning identifiers to the client as the client changes positions.

Client 202 can also include a positioning identifier correlation component 214. Positioning identifier correlation component 214 can be similar to positioning identifier correlation component 220, or it can have more or less functionality than positioning identifier correlation component 220. Positioning identifier correlation component 214 can be used to communicate with the position detection component 204 to identify the current positioning identifier associated with the client 202. The positioning identifier correlation component 214 can compare the client's current positioning identifier with the positioning identifiers included in a generated path downloaded from content manager 206. For every match of positioning identifiers, the positioning identifier correlation component 214 can enable one or more of the images, directions, and landmark information corresponding to the matched positioning identifiers to be transmitted to image display component 216. The image display component 216 can output one or more of the corresponding images, directions, and landmark information to display device 212. Display device 212 can be a monitor, a screen, a projection, eyewear, or other heads-up display. The projection can be, for example, a projection of an image onto a screen or windshield of an automobile. The eyewear can be, for example, eye glasses.

Once a downloaded image is displayed on the display device 212, the image can be oriented to better fit the user's view. Given the client's orientation, as determined by a compass, by other orientation sensors, or by fitting the images to a new image taken by a camera onboard the client 202, the downloaded image can be projected or panned accordingly. For example, a subset of a 360 degree image can be shown on the display device 212 in the direction that the client 202 is heading.

Figure 3:
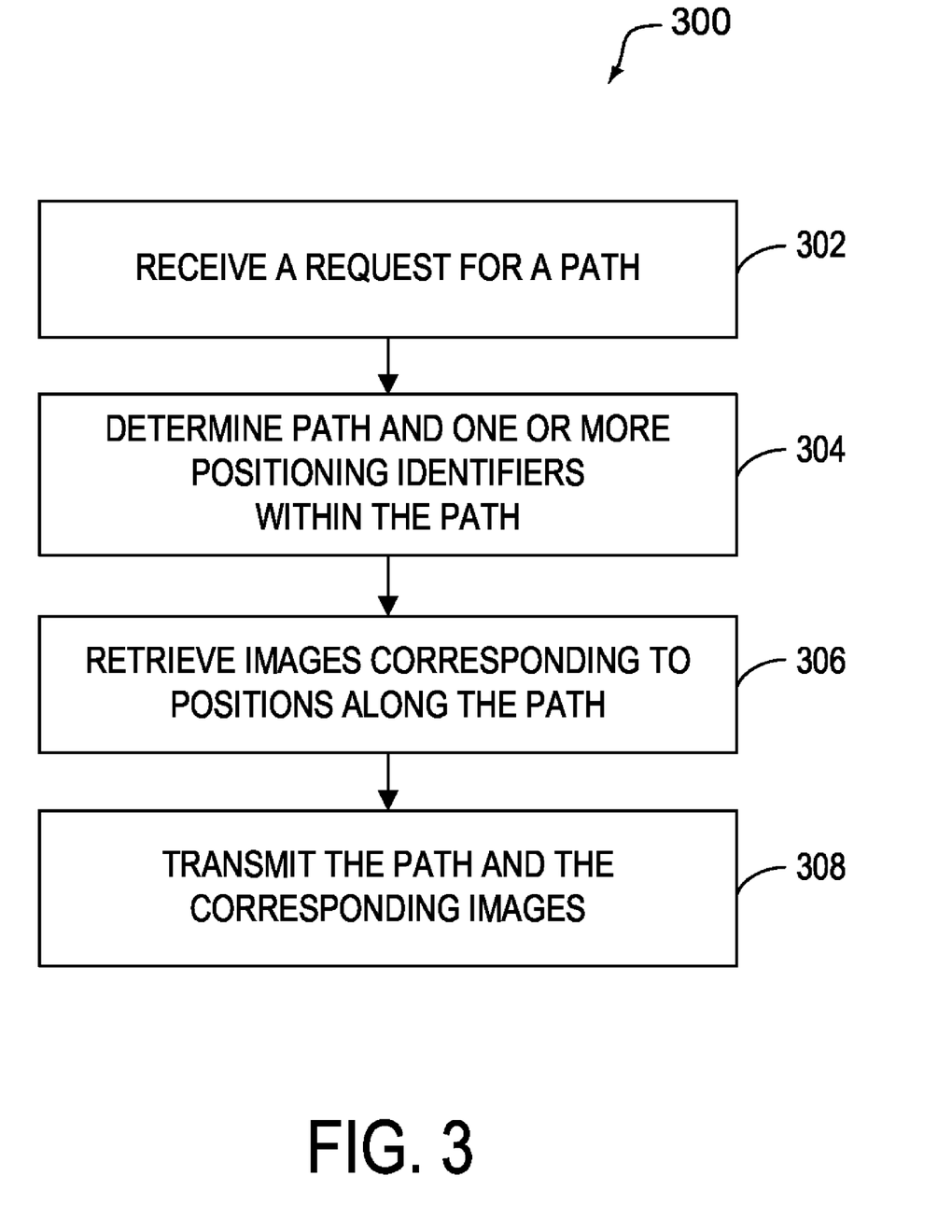
FIG. 3 is a flow diagram of an exemplary method for responding to a request for a path.

FIG. 3 is a flow diagram of an exemplary method 300 for responding to a request for a path. At operation 302, a request for a path is received. In an embodiment, the request is received from a client 202. In another embodiment, the request may be received from a third party device on behalf of the client 202. The request can include a location of a starting point and a location of an ending point. At operation 304, the path including directions and one or more positioning identifiers within the path are determined. For example, the content manager 206 can determine the path and one or more positioning identifiers using direction component 218. At operation 306, images corresponding to the positioning identifiers are identified. For example, the content manager 206 can match the determined positioning identifiers with the positioning identifiers stored in database 208. The content manager 206 can identify all images within database 208 corresponding to the matched positioning identifiers. In another embodiment, landmark information corresponding to the matched positioning identifiers are also identified within database 208. At operation 308, the path, directions, and the identified images are transmitted to the requester. In another embodiment, landmark information is also transmitted to the requester.

Figure 4:
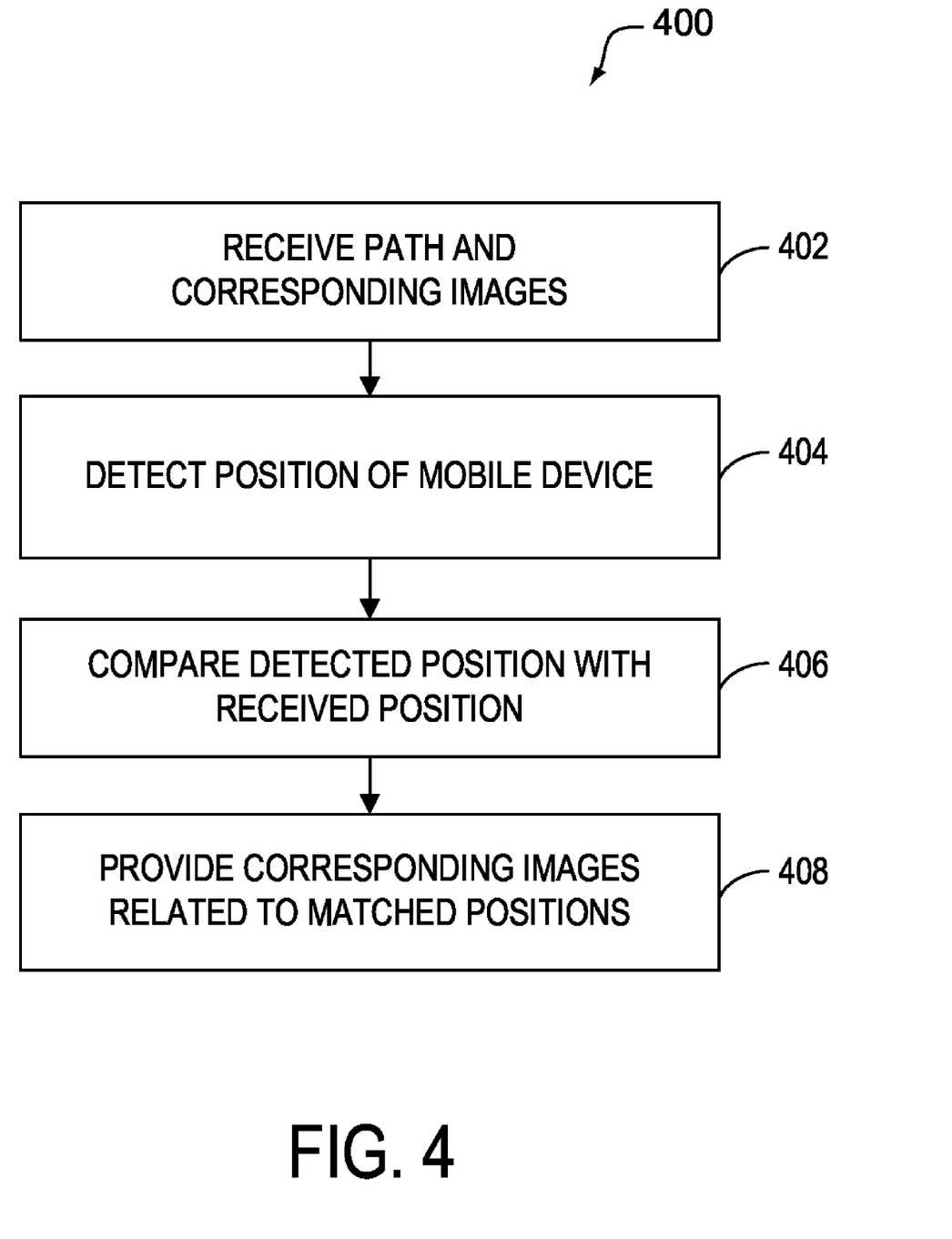
FIG. 4 is a flow diagram of an exemplary method for displaying images corresponding to a path.

FIG. 4 is a flow diagram of an exemplary method 400 for displaying images corresponding to a path. At operation 402, a path and images corresponding to positions along the path are received to a client 202, wherein the positions along the path may be identified with positioning identifiers. In another embodiment, the path and images are received to a separate device, a memory stick for example, that can transfer the downloaded path and images to the client 202. In another embodiment, related landmark information and/or directions are also received. At operation 404, the position of a client 202 is determined. In an embodiment, the position of the client 202 is determined using a position detection component 204 that can identify the client's current positioning identifier. At operation 406, the determined positioning identifier is compared with the received positioning identifiers. A positioning identifier correlation component 214 can be employed to execute operation 406. At operation 408, images are displayed in a display device such as display device 212, wherein the displayed images correspond to the matched positioning identifiers. In another embodiment, one or more of the path, directions, and related landmark information are also displayed.

Figure 5:
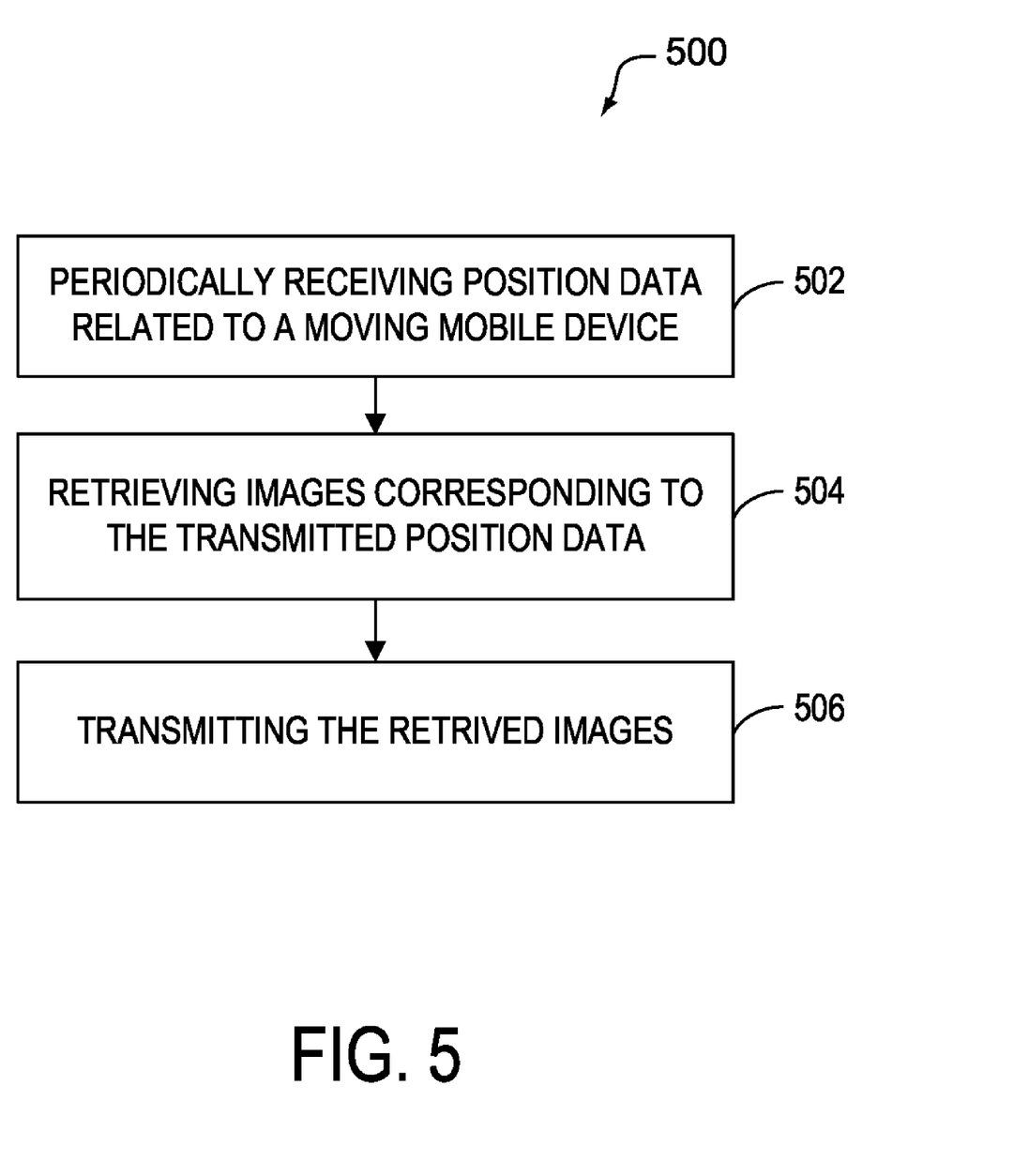
FIG. 5 is flow diagram of an exemplary method for displaying images corresponding to a path currently being traveled.

FIG. 5 is flow diagram of an exemplary method 500 for providing images corresponding to a path currently being traveled. The method of FIG. 5 further describes a method that allows images to be displayed that are related to the current location of a client 202 without the need for a user to have previously requested a path. At operation 502, position data of a client 202 is periodically received by a content manager 206 from the client as the client moves and changes positions. The position detection component 204, for example, can be used to periodically transmit the position data to the content manager 206. In an embodiment, the periodic interval may be so small that it appears that a continuous stream of position data is transmitted to the content manger 206 as the client 202 is in motion. The position data can be, for example, a positioning identifier corresponding to the current location of the client 202. At operation 504, for each of the received positioning identifiers, the corresponding images are retrieved by the content manager 206 from database 208. In another embodiment, landmark information corresponding to the transmitted positioning identifiers may also be retrieved. At operation 506, the retrieved images corresponding to the transmitted positioning identifiers are provided to the client 202. In another embodiment, the images may be transmitted to a separated device, a memory stick for example, that can be used to later transmit the images to the client. In another embodiment, landmark information corresponding to the transmitted positioning identifiers are also transmitted. In embodiment, the method of FIG. 5 can also be configured to incorporate the method of FIG. 4 for providing images related to a requested path. In such an embodiment, even if the client diverts away from the path, an image corresponding to the current location of the client 202 can be transmitted to the client for display.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

I claim:

1. One or more computer-readable media having computer-usable instructions stored thereon for performing a method for displaying images corresponding to a path, the method comprising:
 receiving, at a server, a request for a path from a mobile device;
 identifying a set of positioning identifiers along the path wherein the positioning identifiers identify different position locations within the path of an environment;
 comparing the set of positioning identifiers with one or more stored positioning identifiers wherein the one or more stored positioning identifiers are associated with one or more images;
 if there is a match between the set of positioning identifiers and the one or more stored positioning identifiers, retrieving matched images of the one or more images from the match between the set of positioning identifiers and the one or more stored positioning identifiers, wherein the matched images correspond to one or more positions along the path, wherein the one or more images are actual images of the environment near the corresponding positions; and
 transmitting the path and the matched images in sequence along the path to the mobile device.

2. The media according to claim 1, wherein the actual images are captured by an image-capturing device.

3. The media according to claim 1, wherein the mobile device is at least one of a navigation system, a personal digital assistant, a mobile phone, and a laptop.

4. The media according to claim 1, further comprising transmitting multimedia data that is related to the one or more images.

5. The media according to claim 1, further comprising:
 recognizing the mobile device has diverted from the path; and
 transmitting at least one image not related to the positions along the path, wherein the at least one image is an actual image of the environment where the mobile device is currently located.

6. The media according to claim 1, further comprising:
 periodically receiving one or more items of position data related to a mobile device as the mobile device moves; and
 transmitting one or more images corresponding to the one or more received items of position data, wherein the one or more transmitted images are actual images of an environment near the corresponding one or more items of position data.

7. The media according to claim 1, wherein the path and the one or more images are transmitted from a content server.

8. A method for displaying images corresponding to a path, comprising:
 periodically receiving one or more items of position data at a server related to a mobile device as the mobile device moves;
 comparing the one or more items of position data respectively with one or more stored identifiers wherein the one or more stored identifiers are associated respectively with one or more images wherein the one or more items of position data identify a location, a position, and an orientation of an environment for each of the one or more items of position data;
 if there is a match between the one or more items of position data and the one or more stored identifiers, retrieving one or more images from the match between the one or more items of position data and the one or more stored identifiers, wherein the one or more images correspond to the one or more items of position data, wherein the one or more images are actual images of an environment near the corresponding one or more items of position data; and
 transmitting the corresponding one or more images to the mobile device.

9. The method according to claim 8, wherein the actual images are captured by an image-capturing device.

10. The method according to claim 8, wherein the one or more items of position data are determined by a global positioning sensor.

11. The method according to claim 8, wherein the mobile device is at least one of a navigation system, a personal digital assistant, a mobile phone, and a laptop.

12. The method according to claim 8, wherein the one or more images are downloaded from a content server.

13. The method according to claim 12, further comprising providing multimedia data that is related to the one or more images.

14. A method for displaying images corresponding to a path, comprising:
 providing, from a server, a path and one or more images corresponding to positions along the path to a mobile device, wherein the one or more images are actual images of an environment near the corresponding positions;
 detecting a position of the mobile device;
 assigning a set of positioning identifiers associated with the mobile device based on the position, wherein the positioning identifiers identify a location, a position, and an orientation of an environment;

changing the set of positioning identifiers as the position of the mobile device moves; and providing the one or more images for display as the mobile device moves to the corresponding detected positions along the path.

15. The method according to claim 14, wherein the actual images are images that were taken by an image-capturing device.

16. The method according to claim 14, wherein the position of the mobile device is detected with a global positioning sensor.

17. The method according to claim 14, wherein the path and the one or more images are received from a content server.

18. The method according to claim 14, wherein the mobile device is at least one of a navigation system, a personal digital assistant, a mobile phone, and a laptop.

19. The method according to claim 14, further comprising providing multimedia data for display that is related to the one or more images.

20. The method according to claim 14, further comprising:
recognizing the mobile device has diverted from the path; and providing for display at least one image not related to the positions along the path when the mobile device diverts away from the path, wherein the at least one image is an actual image of the environment where the mobile device is currently located.

* * * * *

UNITED STATES PATENT AND TRADEMARK OFFICE
CERTIFICATE OF CORRECTION

| | | |
|---|---|---|
| PATENT NO. | : 7,941,271 B2 | Page 1 of 1 |
| APPLICATION NO. | : 11/562143 | |
| DATED | : May 10, 2011 | |
| INVENTOR(S) | : Eyal Ofek | |

It is certified that error appears in the above-identified patent and that said Letters Patent is hereby corrected as shown below:

In column 8, line 2, in Claim 5, delete "path;" and insert -- path: --, therefor.

In column 10, line 8, in Claim 20, delete "path;" and insert -- path: --, therefor.

Signed and Sealed this
Twelfth Day of July, 2011

David J. Kappos
*Director of the United States Patent and Trademark Office*